United States Patent Office 3,325,536
Patented June 13, 1967

3,325,536
C-NORPREGNANES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed Mar. 19, 1965, Ser. No. 441,315
8 Claims. (Cl. 260—488)

This invention relates to steroid compounds having physiological activity. In particular, the invention relates to C-norpregnanes having central nervous system depressant activity and hormonal activity, and to intermediates for the preparation thereof. The compounds are primarily progestational and antiandrogenic agents.

The compounds of the present invention are characterized by a steroidal pregnane nucleus in which the C-ring possesses 5 carbon atoms rather than the usual 6 carbon atoms, and is thus designated a C-norpregnane. They are further characterized by either a ketone or alcohol group at the 3 and 20-positions, an optional double bond at the 4–5 positions, and an optional hydroxy or lower acyloxy group at the 17α-position. They thus may be represented by the following structural formula:

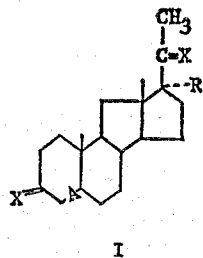

I wherein:
A represents a single or a double bond;
R is hydrogen, hydroxy, or lower acyloxy; and
X is =O or =(H, OH).

For purposes of this invention the term "lower acyloxy" is intended to represent an acyl group having up to 5 carbon atoms therein. Particularly intended are such groups as acetyl, propionyl, butyryl, and isobutyryl.

Also included within the scope of the invention are the C-norpregnanes having an 11-keto or hydroxy group, and a 4-bromo compound, all of which compounds are intermediates useful for the preparation of the physiologically active C-norpregnanes of the present invention.

The C-norpregnane compounds are prepared as described below by a series of reactions which may be readily understood with the aid of Chart I. A 3α,20β-dihydroxy-5β-pregnan-12-one (II) is oxidized with gaseous oxygen in the presence of a strong base such as potassium tert-butoxide. When the reaction is maintained at room temperature for two hours and then worked up, the enol form (III) of an 11,12-diketopregnane is obtained. When the reaction is maintained at room temperature for about 24 hours, and then refluxed for an equal length of time, an oxidation to III and a benzylic acid-type rearrangement to the C-nor hydroxy acid IV both occur. The keto enol III itself may be converted to the C-nor hydroxy acid IV by refluxing overnight with a strong base like potassium tert-butoxide in butanol. Oxidation with lead tetraacetate in acetic acid results in the formation of the C-nor-11-ketopregnane-3,20-diol (V). The 11-keto group is reduced by means of a metal such as sodium with anhydrous hydrazine in an anhydrous alcohol such as propylene glycol. The product, 5β-C-norpregnane-3α,20β-diol, is separated from the 11-hydroxy by-product by fractional crystallization. The diol is then oxidized with chromic acid to 5β-C-norpregnane-3,20-dione (VI). This compound is an important intermediate for the preparation of the Δ⁴ analog and the 17-oxygenated derivatives of both the Δ⁴ and the saturated compounds. It also possesses antiandrogenic and central nervous system depressant activities.

CHART I

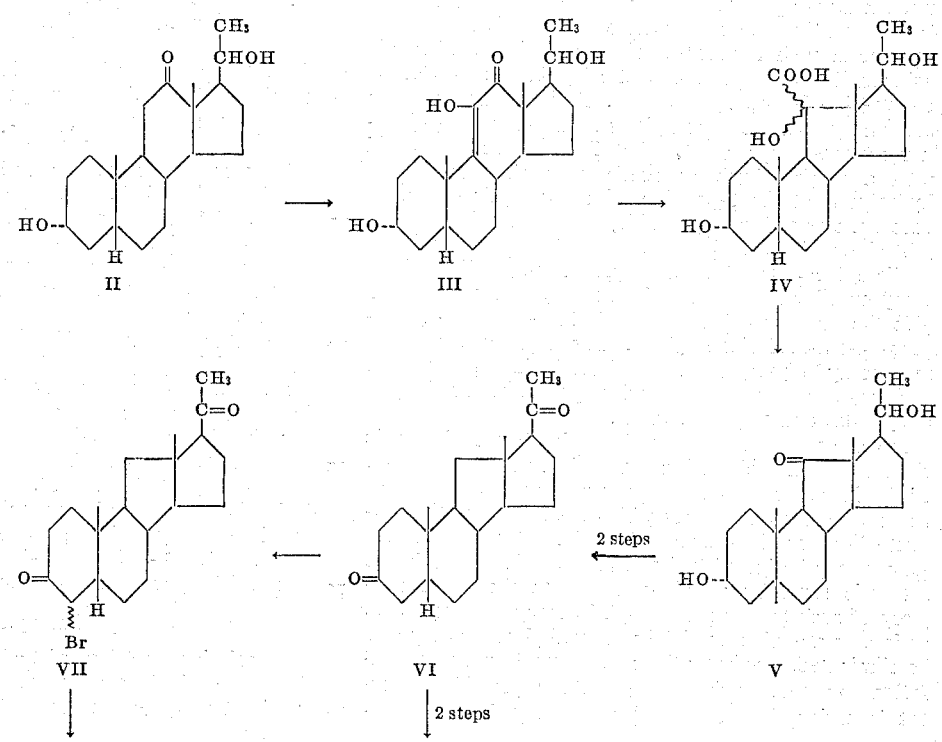

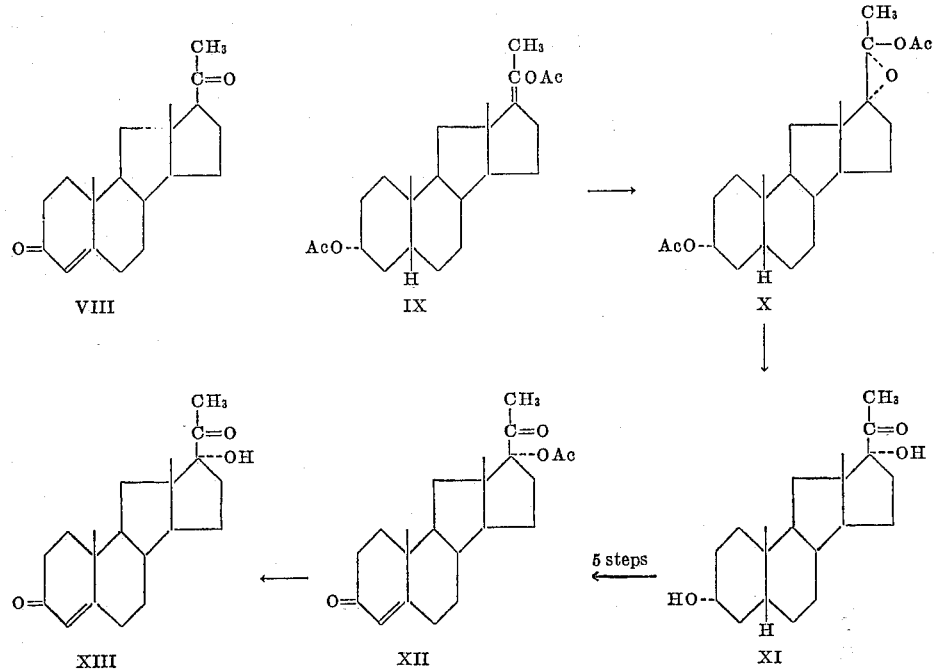

Introduction of the 4–5 double bond is accomplished by bromination at the 4-position in the presence of an acid catalyst such as p-toluenesulfonic acid. Dehydrobromination is accomplished by treatment of the bromo compound VII with semicarbazide, followed by addition of pyruvic acid in aqueous acetic acid. The resulting product, C-norpregn-4-ene-3,20-dione (VIII, C-norprogesterone), is active as a progestational agent.

The 17α-oxygenated group is introduced by the following series of reactions. The C-norpregnane-3,20-dione VI is reduced to the 3α-hydroxy-20-one with a limited amount of sodium borohydride. This intermediate, upon treatment with p-toluenesulfonic acid in acetic anhydride, is converted to the enol acetate IX. Treatment of this compound with a peracid such as m-chloroperbenzoic acid results in the formation of 3α,20β-diacetoxy-17α,20α-epoxy-5β-C-norpregnane (X). Basic hydrolysis with sodium hydroxide solution yields 3α,17α-dihydroxy-5β-C-norpregnan-20-one (XI). The diol can be diacylated with a reagent such as acetic anhydride, selectively hydrolyzed at the 3-position with one equivalent of a base such as sodium hydroxide, and then oxidized to a 3-ketone with chromic acid. The product is the intermediate 17α-acetoxy-5β-C-norpregnane-3,20-dione. This compound is brominated and then dehydrobrominated to give the progestational compound 17α-acetoxy-C-norpregn-4-ene-3,20-dione (XII). The 17α-acetoxy group may be hydrolyzed to the 17α-ol XIII with aqueous base and optionally reacylated with propionic or butyric anhydrides and an acid catalyst.

It will be apparent to one skilled in the art of organic chemistry that the starting material for the preparation of the inventive compounds may possess further substituents and/or double bonds which do not hinder the conduct of the reactions described herein. Alternatively, such groups may be introduced at an appropriate stage in the synthetic route by reactions known to the art. Exemplary of such groups are methyl, hydroxy, acyloxy, halo, amino, or a double bond. The 19-methyl group may also be eliminated. Insofar as these compounds or their preparation do not depart from the essential aspect of the present invention, i.e., C-norpregnanes, they are thus considered equivalents of the compounds specifically described.

The C-norpregnanes of the present invention are administered to an appropriate subject in the form of tablets or capsules containing effective, but nontoxic amounts of steroid mixed with a conventional solid carrier. The carrier contains one or more standard ingredients such as starch, sugar, gums, etc. They are also administered in an oil solution such as sesame oil. They may further be administered in the form of suppositories, dissolved or suspended in a fatty or waxy vehicle which melts approximately at body temperature, or topically in the form of an ointment or cream in which they are dissolved or suspended in an appropriate base.

The following examples are to be considered illustrative of the compounds of the invention, but are not to be considered as limiting the scope thereof.

Example 1

To a solution of 5.01 g. of 3α,20β-dihydroxy-5β-pregnan-12-one (II, U.S. 2,940,991) in tert-butanol is added 60 ml. of 1.02 molar potassium tert-butoxide. The solution is agitated under positive oxygen pressure for 2 hours at room temperature, and the reaction mixture is concentrated at 25–30° to approximately one-half its original volume. The concentrate is diluted with water and the aqueous solution is acidified with 4.5% phosphoric acid. The precipitate is extracted with methylene chloride and the organic phase is extracted with 5% sodium bicarbonate. The residue from evaporation of the dried methylene chloride solution is crystallized from acetone-hexane solution to give 3α,11,20β-trihydroxy-5β-pregn-9(11)-en-12-one (III), M.P. 201°. The sodium bicarbonate solution is acidified and the precipitated acid fraction is filtered and recrystallized from methanol-water solution to give 3α,11,20β-trihydroxy-5β-C-norpregnane-11-carboxylic acid (IV) as a monohydrate, M.P. 136°.

Example 2

A solution of 66 g. of 3α,20β-dihydroxy-5β-pregnan-12-one (II) in 1 liter of tert-butanol is treated with 115.6 g. of potassium tert-butoxide. The agitated solution is exposed to oxygen under a slightly positive pressure for 27 hours and is then heated at reflux temperature for 18 hours. The suspended solid is filtered and the filtrate is concentrated to 450 ml. The concentrate is diluted with water, acidified with dilute phosphoric acid and the precipitated solid is extracted with ethyl acetate. The filter cake is dissolved in water, acidified with phosphoric acid and the precipitated solid is extracted with ethyl acetate. The combined ethyl acetate extracts are washed with 5% sodium bicarbonate solution and the bicarbonate washes are acidified with dilute phosphoric acid. The precipitated 3α,11,20β-trihydroxy-5β-C-norpregnane-11-carboxylic acid, M.P. 130–3° (IV) is collected by filtration.

3α,11,20β-trihydroxy-5β-pregn-9(11)-en-12-one (III) is converted to 3α,11,20β-trihydroxy-5β-C-norpregnane-11-carboxylic acid (IV) by reaction with potassium tert-butoxide in tert-butanol. Thus 0.9 g. of III is dissolved in 250 ml. of tert-butanol, 2.0 g. of potassium tert-butoxide is added, and the turbid reaction mixture is refluxed under nitrogen overnight. The reaction mixture is concentrated, diluted with water, and acidified, and the precipitated 3α,11,20β-trihydroxy - 5β - C - norpregnane-11-carboxylic acid (IV) is collected by filtration, M.P. 131–3°.

*Example 3*

A solution of 44 g. of 3α,11,20β-trihydroxy-5β-C-norpregnane-11-carboxylic acid (IV) in 250 ml. of glacial acetic acid is treated with a suspension of 64 g. of lead tetraacetate in 200 ml. of acetic acid. The addition is carried out with cooling and the reaction is permitted to proceed for 18 hours at room temperature. The reaction mixture is diluted with a mixture of 2.5 liters of 2.5% aqueous potassium iodide solution and 800 ml. of methylene chloride. The precipitated salts are filtered and the solutions partitioned. The organic phases is washed with 5% sodium thiosulfate and bicarbonate solutions. The combined and dried methylene chloride extracts are evaporated to a crystalline residue which is recrystallized from acetone-hexane to give 3α,20β-dihydroxy-5β-C-norpregnan-11-one (V), M.P. 167–168°.

*Example 4*

To a solution prepared by dissolving 3.74 g. of sodium metal in 120 ml. of anhydrous propylene glycol is added 5.5 ml. of anhydrous hydrazine and 7.9 g. of solid 3α,20β-dihydroxy-5β-C-norpregnan-11-one (V). The mixture is protected from moisture and agitated at gentle reflux temperature for 18 hours. Then the temperature is elevated to 180–185° and maintained for 3 hours under azeotropic distillation conditions. The temperature of the reaction mixture is raised to 210° and maintained for 4 hours. The cooled reactants are permitted to remain at room temperature overnight and the gelatinous mass is diluted with water and the crude 5β-C-norpregnane-3α,20β-diol is filtered and dried. Recrystallization from benzene gives the pure diol, M.P. 179–80°. 5β-C-norpregnane-3α,11,20-triol is obtained by chromatography of the residue of crystallization. Thus a solution of 2 g. of a mixture of the diol and triol in 350 ml. of benzene is chromatographed on 60 g. of activity III Woelm alumina. Elution with benzene gives the diol and elution with a methylene chloride-methanol solution gives the triol, M.P. 184.5°.

*Example 5*

A solution of 6.3 g. of 3α,20β-dihydroxy-5β-C-norpregnane in 300 ml. of 2:1 acetone: chloroform is cooled to ice-bath temperature and a solution of chromic acid is slowly added to a slight excess. The reaction mixture is diluted to 2 liters with water and the crude product is recovered by extraction with methylene chloride. The organic phase is washed with aqueous sodium bicarbonate solution, dried and concentrated to give crude crystalline 5β-C-norpregnane-3,20-dione (VI). Recrystallization from acetone-hexane solution elevates the M.P. to 159–60°.

*Example 6*

A solution of 1.4 g. of 5β-C-norpregnane-3,20-dione (VI) in 15 ml. of dimethylformamide containing 35 mg. of p-toluenesulfonic acid is treated with a solution of 0.748 g. of bromine in 35 ml. of dimethylformamide over a 3 hour interval. At the end of the addition of reactants, the reaction is permitted to proceed at 25° for 30 minutes. The reaction solution is diluted with 400 ml. of water and the precipitated solid is collected by filtration. Recrystallization of the dried precipitate from acetone-hexane solution gives 4-bromo-5β-C-norpregnane-3,20-dione (VII), M.P. 175–6° dec.

*Example 7*

A solution of 0.80 g. of 4-bromo-5β-C-norpregnane-3,20-dione (VII) in 25 ml. of 1:1 (v./v.) methylene chloride:tert-butyl alcohol is treated with 0.40 g. of semicarbazide. The mixture is stirred at 25° for 1 hour and a solution of 3 ml. of pyruvic acid in 25 ml. of 20% aqueous acetic acid is added. The solution is permitted to remain at 25° for 18 hours, then concentrated in vacuo, diluted with water, and the precipitate extracted into methylene chloride. The organic phase is washed with sodium bicarbonate solution and dried, and is concentrated to a crystalline residue. The residue affords C-norpregn-4-ene-3,20-diode (VIII), M.P. 144–5°, $\alpha_D^{25}= +261.1$, on recrystallization from acetone-hexane solution.

*Example 8*

A solution of 20 g. of 5β-C-norpregnane-3,20-dione (VI) in 100 ml. of methanol is treated dropwise with 0.87 g. of sodium borohydride in 10 ml. of water containing 1 drop of 10% sodium hydroxide. After stirring at room temperature for 30 minutes, the reaction mixture is poured into cold dilute hydrochloric acid and extracted with methylene chloride. The combined and dried methylene chloride extracts are evaporated and the crude product is recrystallized from acetone-hexane to give 3α-hydroxy-5β-C-norpregnan-20-one.

*Example 9*

A solution of 17 g. of the ketone of Example 8 and 1 g. of p-toluenesulfonic acid in 250 ml. of acetic anhydride is distilled slowly through a short column during 5 hours until most of the solvent is gone. The residue is poured into ice water and extracted with methylene chloride. After washing with dilute sodium carbonate solution and drying, the methylene chloride extracts are evaporated to a residue. The residue is dissolved in benzene-petroleum ether (1:2) and passed through a column of 200 g. of activity III Woelm alumina. Evaporation of the eluate gives the product 3α,20-diacetoxy-5β-C-norpregn-17(20)-ene (IX), which is used directly in the next step.

*Example 10*

A solution of 18 g. of the diacetate IX of Example 9 in 250 ml. of chloroform is treated with 12 g. of m-chloroperbenzoic acid in portions. After 2 hours at room temperature the reaction mixture is washed with sodium sulfite solution and then with dilute sodium carbonate. Drying and evaporation of the methylene chloride phase gives 3α,20β - diacetoxy-17α,20α-epoxy-5β-C-norpregnane (X), which is used directly in the next step.

*Example 11*

A solution of 18 g. of the epoxy diacetate X of Example 10 in 300 ml. of ethanol is treated with 300 ml. of 5% sodium hydroxide. The addition is carried out at room temperature with stirring during 20 minutes. After 1 hour, 500 ml. of water is added, the reaction mixture is cooled and filtered, and the filter cake is recrystallized from methanol-acetone to give 3α,17α-dihydroxy-5β-C-norpregnan-20-one (XI).

*Example 12*

A solution of 10 g. of the diol XI of Example 11 in 50 ml. of acetic anhydride containing 0.2 g. of p-toluenesulfonic acid is stirred at room temperature for 20 hours. The reaction mixture is poured into ice water and extracted with methylene chloride. After washing with sodium hydroxide solution and drying, the methylene chloride phases are evaporated. The residue of 3α,17α-diacetoxy-5β-C-norpregnan-20-one is used directly in the next step.

Example 13

A solution of 11 g. of the diacetate of Example 12 in 100 ml. of ethanol is treated with a solution of 1.1 g. of sodium hydroxide in 20 ml. of water. The addition is carried out during 1 hour, with stirring at room temperature. After a total reaction time of 3 hours, 200 ml. of water is added and the reaction is cooled and filtered. The filter cake is recrystallized from acetone-hexane to give 3α-hydroxy-17α-acetoxy-5β-C-norpregnan-20-one.

Example 14

A stirred solution of 8 g. of 3α-hydroxy-17α-acetoxy-5β-C-norpregnan-20-one in 100 ml. of acetone is cooled to 0° C. and treated with an excess of chromic acid. After 3 minutes the reaction mixture is poured into water and extracted with methylene chloride. Evaporation of the combined and dried methylene chloride extracts gives 17α-acetoxy-5β-C-norpregnane-3,20-dione.

Example 15

A solution of 6.5 g. of 17α-acetoxy-5β-C-norpregnane-3,20-dione in 15 ml. of dimethylformamide containing 136 mg. of p-toluenesulfonic acid is treated with a solution of 2.9 g. of bromine in 150 ml. of dimethylformamide over a 3 hour period. At the end of the addition, the reaction is allowed to proceed at 25° C. for 30 minutes. The reaction mixture is diluted with 400 ml. of water and the precipitated solid is collected by filtration. Recrystallization gives 4-bromo-17α-acetoxy-5β-C-norpregnane-3,20-dione.

Example 16

A solution of 0.93 g. of 4-bromo-17α-acetoxy-5β-C-norpregnane-3,20-dione in 25 ml. of 1:1 (v./v.) methylene chloride:tert-butyl alcohol is treated with 0.40 g. of semicarbazide. The mixture is stirred at 25° for 1 hour and a solution of 3 ml. of pyruvic acid in 25 ml. of 20% aqueous acetic acid is added. The solution is permitted to remain at 25° for 18 hours, then concentrated in vacuo, diluted with water, and the precipitate extracted with methylene chloride. The organic extracts are washed with sodium bicarbonate solution and dried, and concentrated to a residue. The product, 17α-acetoxy-C-norpregn-4-ene-3,20-dione (XII), is recrystallized from acetone-hexane.

Example 17

A solution of 4.5 g. of 17α-acetoxy-C-norpregn-4-ene-3,20-dione (XII) in 75 ml. of ethanol is treated with 75 ml. of 5% sodium hydroxide. The addition is carried out at room temperature with stirring over 20 minutes. After 1 hour, 125 ml. of water is added, the reaction mixture is cooled and filtered, and the filtered solid recrystallized to give 17α-hydroxy-C-norpregn-4-ene-3,20-dione (XIII).

Example 18

A solution of 2 g. of 17α-hydroxy-C-norpregn-4-ene-3,20-dione in 20 ml. of propionic anhydride containing 0.05 g. of p-toluenesulfonic acid is allowed to stand at room temperature overnight. The solution is poured into ice water, allowed to stand, and the resulting solid filtered off. Recrystallization gives 17α-propionoxy-C-norpregn-4-ene-3,20-dione.

Example 19

A stirred solution of 4 g. of 3α,20β-dihydroxy-5β-C-norpregnan-11-one in 100 ml. of acetone is cooled to 0° C. and treated with an excess of chromic acid. After 3 minutes the reaction mixture is poured into water and extracted with methylene chloride. Evaporation of the dried organic extract gives 5β-C-norpregnane-3,11,20-trione.

We claim:
1. A compound of the structure

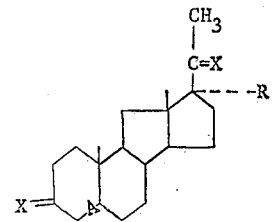

wherein:
  A is selected from the group consisting of a single bond and a double bond;
  X is selected from the group consisting of =O and =(H, OH); and
  R is selected from the group consisting of hydrogen, hydroxy and lower alkanoyloxy of up to 5 carbon atoms.
2. A compound of the structure

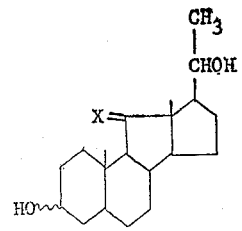

where X is selected from the group consisting of =O and =(H, OH).

3. 5β-C-norpregnane-3,20-dione.
4. C-norpregn-4-ene-3,20-dione.
5. 5β-C-norpregnane-3α,20β-diol.
6. 4-bromo-5β-C-norpregnane-3,20-dione.
7. 17α-acetoxy-C-norpregn-4-ene-3,20-dione.
8. 17α-hydroxy-C-norpregn-4-ene-3,20-dione.

References Cited
FOREIGN PATENTS
1,316,008   12/1962   France.

LORRAINE A. WEINBERGER, *Primary Examiner.*

V. GARNER, *Assistant Examiner.*